United States Patent [19]

Hahin

[11] 4,167,260

[45] Sep. 11, 1979

[54] BRACKET MEANS FOR MOUNTING TEST FIXTURES ON BOILER TUBES

[76] Inventor: Christopher Hahin, 2409 Carrelton Dr., Champaign, Ill. 61820

[21] Appl. No.: 895,881

[22] Filed: Apr. 13, 1978

[51] Int. Cl.² .................................................. F16M 13/00
[52] U.S. Cl. ............................. 248/225.3 A; 248/227.1
[58] Field of Search ............... 248/225.3, 226.1, 227.1, 248/232, 233; 211/86

[56] References Cited

U.S. PATENT DOCUMENTS

| | | | |
|---|---|---|---|
| 231,126 | 8/1880 | Webb et al. | 248/226.1 X |
| 805,240 | 11/1905 | Sims | 248/227.1 |
| 1,237,749 | 8/1917 | Chapman | 248/227.1 X |
| 1,539,576 | 5/1925 | Kennard | 211/86 |
| 2,010,596 | 8/1935 | Klaudt | 248/235 X |
| 2,636,616 | 4/1953 | Webb | 211/86 X |
| 2,708,540 | 5/1955 | Cook et al. | 248/225.3 X |
| 3,447,727 | 6/1969 | Lowe | 248/226.1 X |
| 3,544,049 | 12/1970 | Brown | 248/226.1 X |
| 3,948,475 | 4/1976 | Jones | 248/225.3 |

Primary Examiner—William H. Schultz
Attorney, Agent, or Firm—Thomas O. Maser

[57] ABSTRACT

A bracket is disclosed for attaching an oxidation test fixture or the like to a pair of parallel boiler tubes. The bracket includes a support bar, a pair of jaws the remote faces of which each has a configuration which conforms generally with the adjacent portion of the outer periphery of the associated boiler tube, and shaft means with oppositely threaded ends connecting the pair of jaws. The bracket is placed between the boiler tubes and the threaded shaft is turned to simultaneously displace the jaws apart into tight engagement with the tubes. A test rack designed to hold various metal samples is then attached to the support bar.

3 Claims, 7 Drawing Figures

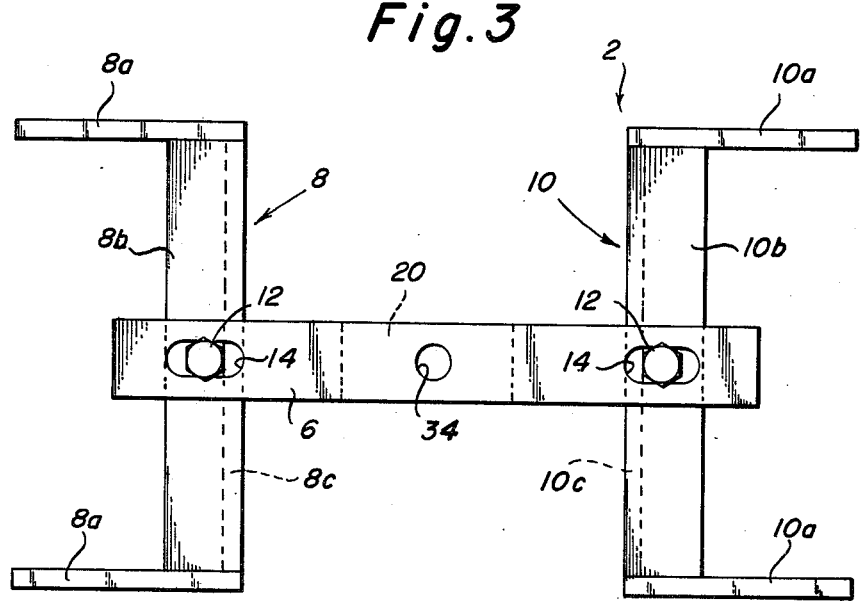
Fig. 3
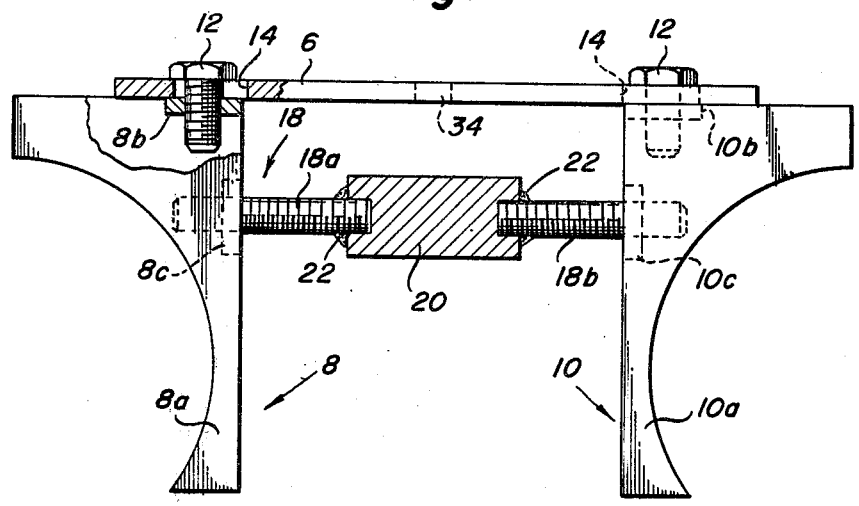
Fig. 4
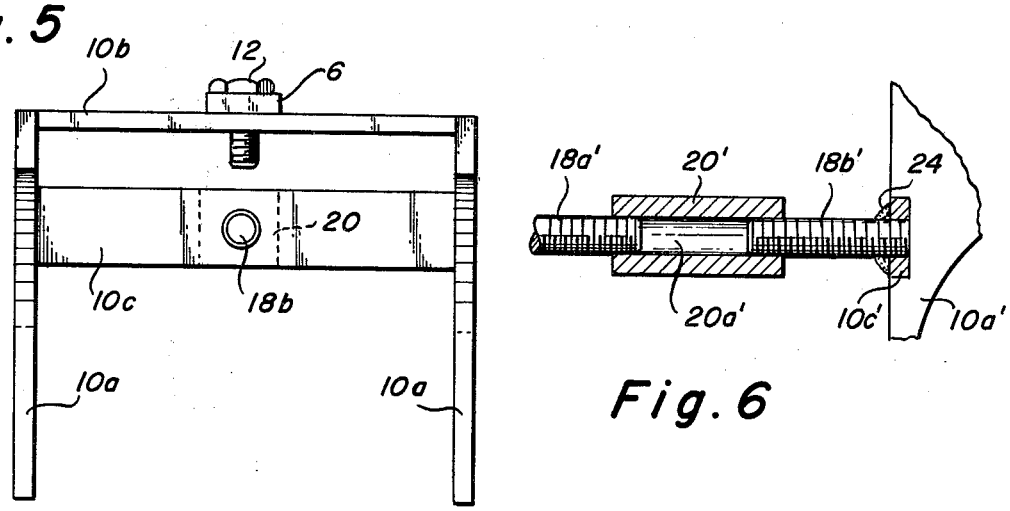
Fig. 5
Fig. 6

BRACKET MEANS FOR MOUNTING TEST FIXTURES ON BOILER TUBES

STATEMENT OF THE INVENTION

This invention relates to bracket means for supporting test components for exposure to boiler combustion gases and heat. The bracket means is designed for mounting at various locations between the boiler tubes before the boiler is activated, and is removed when the boiler has cooled.

BACKGROUND OF THE PRIOR ART

In many industries it becomes necessary to conduct oxidation tests on metal samples prior to their industrial use. One preferred method of conducting such tests is to expose the metals to the gases and heat extant in an existing boiler facility.

It is well known in the prior art, as evidenced, for example, by the prior U.S. Pat. Nos. to Wilkening No. 457,977, Klaudt 2,010,596, Pirone 2,293,168, Burkey 2,725,989 and Wisecarver 3,880,394, among others, to provide longitudinally extensible brackets that are adapted for mounting between a pair of stationary objects. It is also known to provide pipe brackets or the like including members having faces that conform with the outer periphery of the pipe or tube that is to be supported thereby, as taught, for example, by the patent to Downs U.S. Pat. No. 2,578,993.

The present invention was developed to permit a plurality of specimens to be tested without creating excessive disturbance to the refractories behind the boiler tubes such as would occur if the samples were attached to the tubes by means of bands, spring-loaded clamps or ring clamps. Such devices can only be attached to the tubes by removing the refractory behind the tube, while the bracket of the present invention is merely slipped in place between two parallel tubes and the oppsositely threaded shaft is ratcheted until the jaws of the bracket fit securely against, and partially around, the two tubes. The slightly greater than ¼ revolution of the jaw configuration prevents the bracket from being pulled out by weight of the specimens or by exhaust gas draft. When the boiler tubes expand during heating, the bracket is forced into greater tightness. Unlike clamps or other devices which might damage or penetrate the tubes, the relatively soft material of the bracket will compensate for tube expansion by deforming. In addition, the adjustable jaws of the bracket enable its use in facilities having a variety of on-center distances between boiler tubes.

The low profile of the present invention permits a variety of metals to be tested without severely disturbing the normal gas flows within the boiler facility, and the simplicity of its design requires minimal machining and welding skills for its assembly.

SUMMARY OF THE INVENTION

Accordingly, a primary object of the present invention is to provide improved bracket means adapted for connection between a pair of vertical tubes or the like, including a support member adapted for arrangement adjacent and normal to a pair of boiler tubes, a pair of jaw members adapted to be positioned between the tubes, means connecting the jaw members for longitudinal displacement relative to the support member, and screw thread means connected between said jaw members for simultaneously displacing said jaw members apart into tight engagement with the tubes, whereby the bracket means is rigidly fastened to said tubes for supporting test fixtures in proximity thereto. Preferably, the remote faces of the jaw members have a configuration to conform with the adjacent peripheral portions of the tubes, which peripheral portion is on the order of ¼ of the circumference of the associated tube.

In accordance with a more specific object of the invention, the means for connecting each jaw member with the support member includes bolt and longitudinal slot means, which bolt means may be tightened to lock the associated jaw against longitudinal displacement relative to the support member.

A further object of the invention is to provide a pair of jaw means each of which includes a pair of parallel spaced plates adapted for engagement with longitudinally spaced locations on the associated tube, thereby to stabilize the jaw against rocking movement relative to the tube. In one embodiment, the screw thread means includes a shaft the ends of which are provided with threads of opposite pitch that are threadably connected with the jaw members, respectively, a manual operating member being provided adjacent the central portion of the shaft. In a second embodiment, a pair of aligned oppositely threaded shafts are connected at their remote ends with the jaw members, respectively, the adjacent ends of said shafts being threadably connected with an operating member arranged between the shafts.

BRIEF DESCRIPTION OF THE DRAWING

Other objects and advantages of the invention will become apparent from a study of the following specification when viewed in the light of the accompanying drawing, in which:

FIGS. 3–5 are front elevation, top plan and detailed end views, respectively, of the bracket means of FIG. 2;

FIG. 6 is a detailed sectional view of a second embodiment of the screw thread means of the apparatus of FIG. 2.

DETAILED DESCRIPTION

Referring first more particularly to FIGS. 1 and 2, the bracket means 2 of the present invention is adapted for mounting between two of a plurality of vertical boiler tubes 4, whereby test fixtures may be subsequently mounted in proximity to the boiler tubes as will be described in greater detail below.

Figure 2:
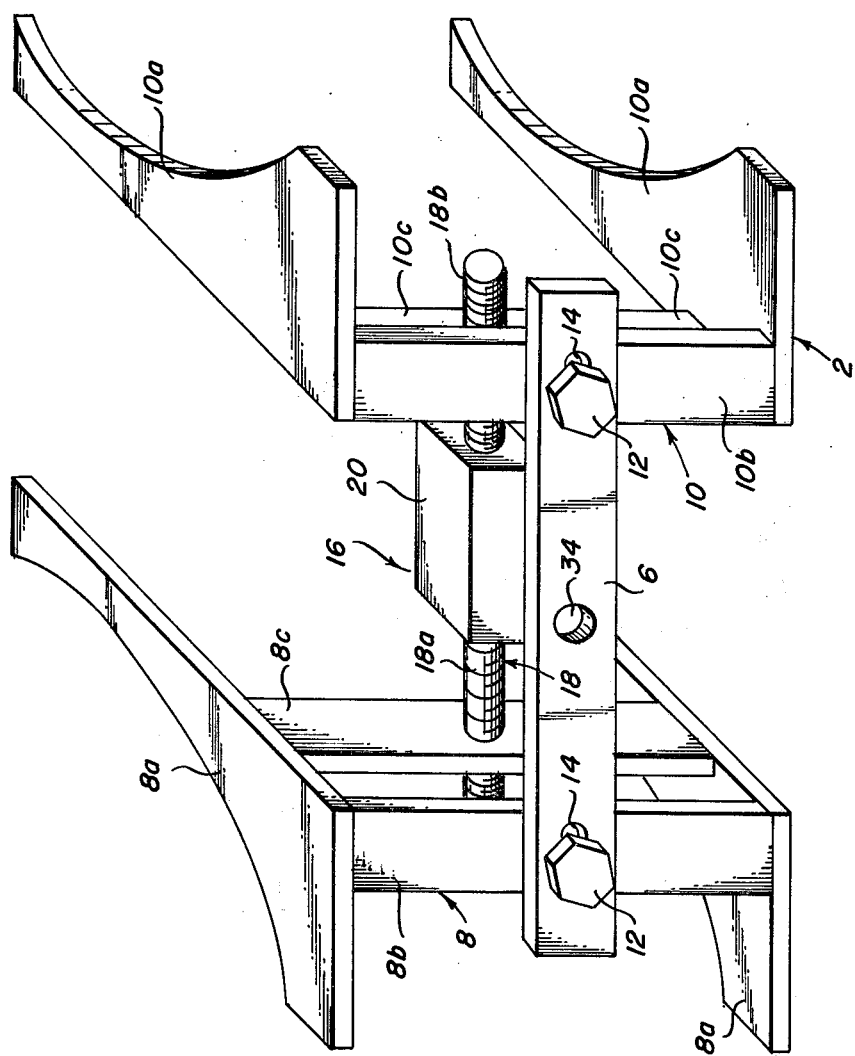
FIG. 2 is a perspective view of the improved bracket means of the present invention.

As shown in FIG. 2, the bracket means includes a horizontal support member 6, and a pair of jaw members 8 and 10 that are connected for longitudinal displacement relative to the support member 6. More particularly, the connecting means for connecting each jaw member to the support member includes a hex-headed bolt 12 that extends through a longitudinal slot 14 contained in the support member 6, which bolt is threadably connected at its other end with the associated jaw member. The jaw members 8 and 10 are displaced in opposite directions relative to the support member 6 by screw thread means 16 connected between the jaw members. In the illustrated embodiment, the screw thread means comprises a rigid shaft 18 the opposite ends 18a and 18b of which are provided with screw threads of opposite pitch, which threaded ends are threadably connected with the associated jaw members 8 and 10, respectively. A manual operating member 20 is rigidly connected between the ends of the shaft 18, for example, by welds 22 as shown in FIG. 4.

As shown in FIGS. 2–5, each jaw member includes a pair of parallel spaced horizontal plates 8a and 10a that are connected by vertical plates 8b, 8c and 10b, 10c, the plates 8b and 10b being contained in a plane parallel with the support member 6, and the plates 8c and 10c being contained in planes normal to the support member 6. The various plate members that divide the jaws are rigidly connected together, for example, by welding.

Figure 1:
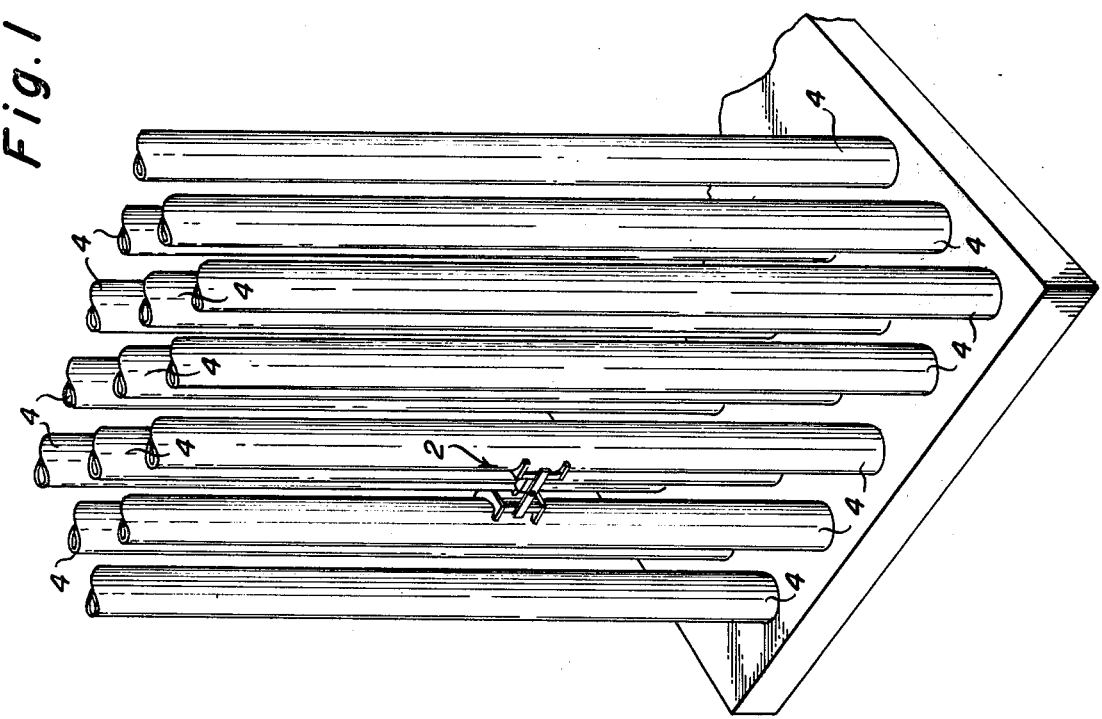
FIG. 1 is a perspective view illustrating the manner in which the bracket means of the present invention is fastened between two of a plurality of boiler tubes.

In operation, the bracket means 2, with the bolts 12 loosened and with the jaws 8 and 10 in the retracted position, are inserted between a pair of boiler tubes 4 as shown in FIG. 1, whereupon the operating member 20 is rotated to effect separation of the jaw members into tight engagement with the adjacent vertical boiler tubes, whereupon bolts 12 are then tightened to lock the bracket means in place.

In the modification of FIG. 6, the screw means for displacing the jaw members in opposite directions relative to the support member comprise a pair of oppositely threaded shafts 18a' and 18b' the remote ends of which are rigidly secured to the associated jaw member, for example, by a weld 24. The adjacent ends of the oppositely threaded screw members are threadably connected in a through bore 20a' that extends longitudinally through the operating member 20'. Consequently, depending on the direction of rotation of the operating member 20', the screw members 18a' and 18b' together with the jaw members attached thereto are displaced in opposite directions longitudinally of the support member 6.

Figure 7:
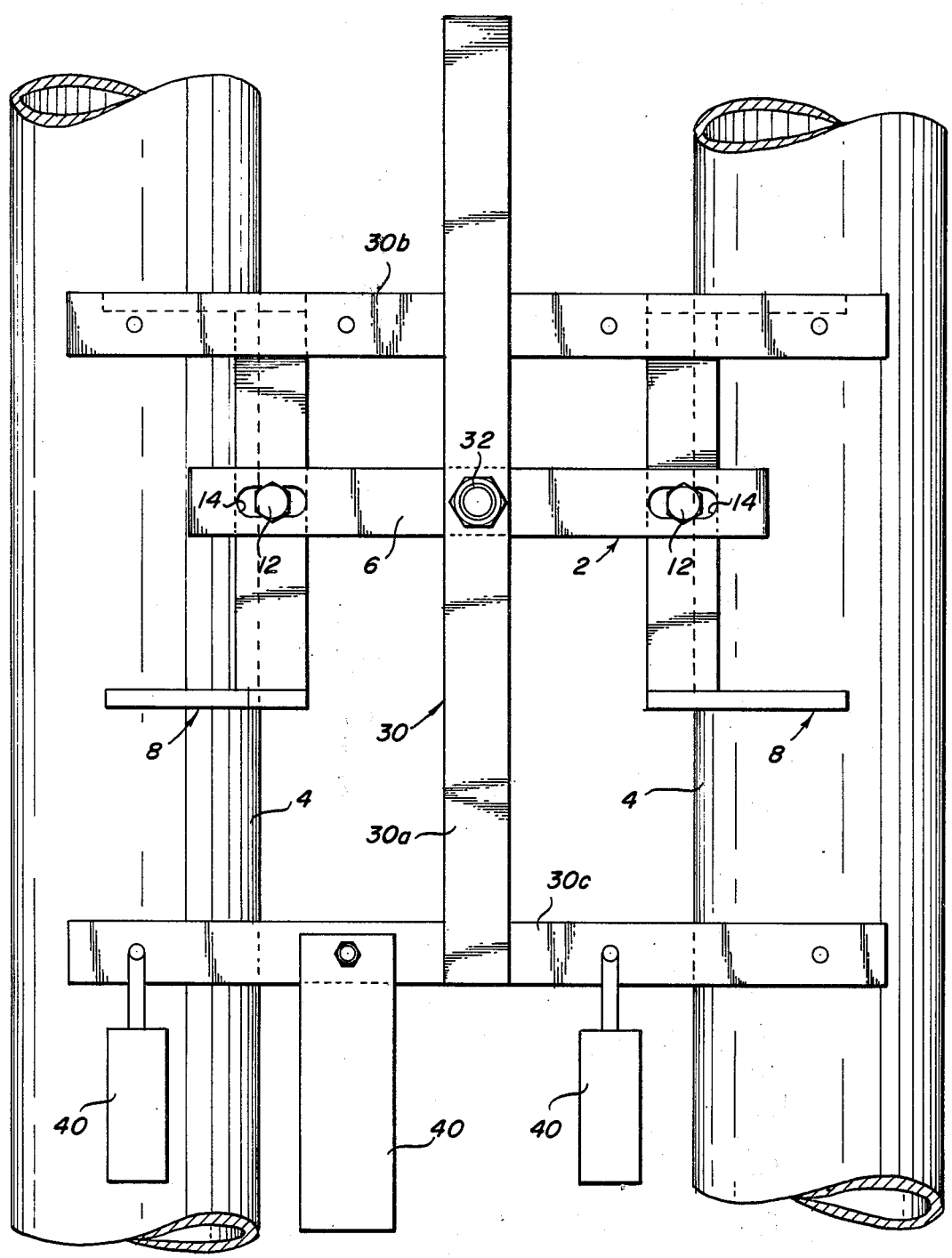
FIG. 7 is an elevational view illustrating a test component support rack connected with the bracket means of the present invention.

Referring now to FIG. 7, after the bracket means 2 has been rigidly connected between a pair of vertical boiler tubes 4, a test specimen rack 30 is bolted to the support member 6 by means of bolt 32 that extends through a threaded opening 34 contained in the central portion of the support member 6. More particularly, the rack 30 includes a vertical central portion 30a, to which are rigidly connected upper and lower horizontal arm portions 30b and 30c from which the test devices 40 may be suspended or to which specimens may be bolted. Consequently, the bracket means 2 and the rack 30 serve to mount the test specimens 40 in close proximity to the boiler tubes 4, whereby the test specimens are exposed to the high temperature gases surrounding the boiler tubes.

Preferably the elements of the bracket means 2 and the rack 30 comprise plate elements formed from a sheet of metal resistant to high temperatures and the corrosive effects of the combustion gases, for example, a stainless steel or an inconel. Preferably, the plate components have a thickness of at least ⅛ of an inch when the boiler tubes have a diameter of approximately 2½ inches.

It will be apparent that the bracket means of the present invention may be constructed with a minimal amount of machining and by a person possessing basic welding skills, and furthermore the bracket means may be readily rigidly connected with the boiler tubes in a simple and safe manner.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. Bracket means for attaching an oxidation test fixture or the like between a pair of parallel boiler tubes, comprising:
    (a) a support member adapted for arrangement normal to, extending across and adjacent the outer peripheries of the boiler tubes;
    (b) a pair of jaw members adapted for arrangment between and adjacent the opposed peripheral surfaces of the boiler tubes, respectively, the remote faces of said jaw members each having a configuration to conform generally with the adjacent outer peripheral surface of the associated tube;
    (c) means connecting said jaw members for longitudinal displacement relative to said support member, said connecting means including a bolt connected with one of said jaw and support members and extending through a longitudinal slot contained in the other of said members; and
    (d) screw thread means connected between said jaw members for simultaneously displacing said jaw members in opposite directions longitudinally of said support member, whereby said screw thread means are operable to separate said jaw members into tight engagement with the tubes and thereby rigidly mount said support member on the tubes.

2. Apparatus as defined in claim 1, wherein the longitudinal slot is contained in said support member, said bolt being operable to rigidly fasten the associated jaw member against longitudinal displacement relative to said support member.

3. Bracket means for attaching an oxidation test fixture or the like between a pair of parallel boiler tubes, comprising:
    (a) a support member adapted for arrangement normal to, extending across and adjacent the outer peripheries of the boiler tubes;
    (b) a pair of jaw members adapted for arrangement between and adjacent the opposed peripheral surfaces of the boiler tubes, respectively, each of said jaw members including a pair of spaced parallel plates parallel with and arranged on opposite sides of said support member, respectively, the face of each of said plates adjacent the associated tube containing a concave recess the configuration of which corresponds with the outer periphery of the tube, whereby the jaw member is stabilized against rocking relative to the tube;
    (c) means connecting said jaw members for longitudinal displacement relative to said support member; and
    (d) screw thread means connected between said jaw members for simultaneously displacing said jaw members in opposite directions longitudinally of said support member, whereby said screw thread means are operable to separate said jaw members into tight engagement with the tubes and thereby rigidly mount said support member on the tubes.

* * * * *